(12) United States Patent
Lopke (10) Patent No.: US 6,553,310 B1
(45) Date of Patent: Apr. 22, 2003

(54) METHOD OF AND APPARATUS FOR TOPOLOGICALLY BASED RETRIEVAL OF INFORMATION

(75) Inventor: Michael S. Lopke, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/712,874

(22) Filed: Nov. 14, 2000

(51) Int. Cl.[7] .............................................. G06F 15/16
(52) U.S. Cl. ...................... 701/213; 709/203; 709/223; 709/229; 709/217; 709/104
(58) Field of Search ................................. 701/213, 200, 701/201, 211, 207; 709/203, 226, 224, 227, 104, 223, 229, 217, 219, 232, 249; 704/275; 340/988

(56) References Cited

U.S. PATENT DOCUMENTS

| | | | | |
|---|---|---|---|---|
| 5,511,208 A | * | 4/1996 | Boyles et al. ................ | 395/800 |
| 5,560,008 A | * | 9/1996 | Johnson et al. .............. | 395/650 |
| 5,825,306 A | * | 10/1998 | Hiyokawa et al. ........... | 340/988 |
| 6,047,327 A | * | 4/2000 | Tso et al. .................... | 709/232 |
| 6,067,521 A | * | 5/2000 | Ishii et al. ................... | 704/275 |
| 6,122,658 A | * | 9/2000 | Chaddha ...................... | 709/203 |
| 6,148,260 A | * | 11/2000 | Musk et al. ................. | 701/200 |
| 6,154,172 A | * | 11/2000 | Piccionelli et al. ......... | 342/357.1 |
| 6,170,013 B1 | * | 1/2001 | Murata ......................... | 709/229 |
| 6,202,023 B1 | * | 3/2001 | Hancock et al. ............. | 701/201 |
| 6,216,153 B1 | * | 4/2001 | Vortriede ..................... | 709/203 |
| 6,222,483 B1 | * | 4/2001 | Twitchell et al. ....... | 342/357.09 |
| 6,240,360 B1 | * | 5/2001 | Phelan ......................... | 701/208 |
| 6,345,266 B1 | * | 2/2002 | Ganguly et al. ............... | 707/1 |

* cited by examiner

*Primary Examiner*—Thomas G. Black
*Assistant Examiner*—Tuan C To (57) ABSTRACT

An apparatus for, and a method of, customizing an Internet session to the current location of the user which can, through a variety of methods, identify a user's specific location and once the specific location is determined, customize Internet information for the user's specific location. The location can be determined through a GPS device, user input or calculation and application of location parameters from a known position or similar methods. The customized Internet information can be accessed via, for example, CDPD, and user specific queries can be addressed through Internet search capabilities coupled with local processing.

24 Claims, 6 Drawing Sheets

METHOD OF AND APPARATUS FOR TOPOLOGICALLY BASED RETRIEVAL OF INFORMATION

BACKGROUND

The Internet provides a wealth of information that is readily available to users having access to the network. Because of the great number of information sources available, search engines and directories are commonly employed in an effort to identify, locate, access and retrieve information from sources via the Internet. However, the rapid expansion of information available via the Internet has sometimes hindered rather than helped a user searching for information, as the desired information is hidden or completely supplanted by the irrelevant. To the consternation of users, search engines often miss relevant information or are unable to parse through directories and web pages to focus a search and retrieve the most relevant information.

Accordingly, a need exists for a system for and method of identifying information pertinent to a user. A further need exists for a system and method that automatically identifies resources based on accessability to the user.

SUMMARY OF THE INVENTION

An object of the invention is to incorporate topological criteria in identifying network available resources. The topological criteria may be in the form of the physical location of a user vis-a-vis a location of a desired resource or may include a data path topology for accessing resources closest on a data network. Location information about the user is automatically supplied and incorporated into a locally or remotely initiated and/or executed search for and of resources.

Another object of the invention is to provide an information rich navigation or "mobile concierge" service, automatically providing information from remote sources based on the location of the user. Features of the navigation system may include a graphical map display of geographical features such as roads, streets, cities, airports, etc., augmented by facility information, such as rest stops, points of interest, etc. The system may further obtain and display dynamically changing information, such as road conditions (e.g., accidents, vehicular congestion, police activity, construction, surface conditions, etc.) weather, local events, alerts, etc. The information may be graphically displayed as part of a moving map and/or provided as text. As applicable, other means of presentation may also be employed, such as audio playback of sound files or speech resultant from local or remote text-to-speech conversion of information.

The invention provides enhanced search results of resources by including user location information criteria to select resources based on availability and accessability to the user. According to one aspect of the invention, user location information is provided to a server which prioritizes information retrieval and resource identification based on proximity. Such proximity may include physical location with respect to the requestor or network accessibility wherein resources traversing a minimal span of a network or sub-network are identified in preference to more distantly connected resources. Proximity may be calculated directly (e.g., great circle distance between map coordinates or link distance between network nodes) or as distance to the resource (e.g., travel time, time for detour from route, total time to transfer data, bandwidth, path cost distance, etc.) One embodiment includes implementation of topological criteria using either client or server facilities, or both. Thus, a server may solicit or otherwise obtain location information from a client, such as the location of a user, location of a desired resource, routing or route of travel, etc., and use the location information to identify resources (e.g., shopping and service facilities, Internet servers and mirror sites, etc.) satisfying topographical criteria in addition to other search criteria, such as having selected key words (e.g., crawler based searches), falling within specified classes or types of resources (e.g., directory based listings), etc.

In the case of portable devices, the invention combines the position identifying capability of GPS (Global Positioning System) with the information available via the Internet. This provides a unified device that uses present position to determine distances to points of interest identified using information available on the Internet. Thus, the invention incorporates remotely accessible information into a positionally relevant display to provide enhanced maps, text, and other forms of information in a mobile environment. The remotely accessible information may be obtained, for example, via the Internet. According to a feature of the invention, the system may access a device specific resource to obtain device program database updates and to provide supplementary information about road conditions, local points-of-interest, etc. According to another feature, a system according to the invention automatically searches Internet sites and resources for information pertinent to a present position of a vehicle or mobile user by employing search engines and other information retrieval agents and automatic hyperlink following features.

According to an aspect of the invention, a method of identifying information based on topological criteria include identification of information to be retrieved based on topological criteria. A search is conducted of a resource (e.g., database(s)) for the class of information also satisfying the topological criteria. The class of information may be identifiable by a key (e.g., indicative of a category of information such as weather statistics for an area or of a facility such as local accommodations, restaurants, etc.) The topological criteria may include a location of a requestor so that the search may be centered on that location; the location of some remote site such as a planned destination; or a route of travel. The key and location are transmitted to a remote server and a result of the search (i.e., a reply) is returned to the requestor.

According to a feature of the invention, communications is established with the resource using a communications network wherein the location is relative to a topology of the communications network. Thus, for example, a local or wide area network (LAN or WAN) or the Internet may be used to access a resource with the location of the resource on the network relative to the requestor being a criteria for selecting a resource (e.g., server or other network node).

According to another feature of the invention, communications is established with the resource and target data associated with respective physical facilities is returned in response to the key and the topological criteria wherein the location is relative to a geographic (i.e., map) location of either the requestor or that of the physical facilities. The physical facilities may be identified by respective street addresses or other form of addressing scheme including ordered pairs of latitude and longitude values, zipcode, zip+4, telephone number, etc.

According to another aspect of the invention, location information is communicated to a remote server using a common gateway interface (CGI.) The CGI provides for automatic transmission of client location information using, for example, pre-stored address data contained in a web browser "cookie". Alternatively, the CGI may be used to transmit information entered into a form page by a user. Geographic search criteria may be defined based on the topological criteria. A list of facilities having the class of information and satisfying the topological criteria is transmitted back by the server to the client.

According to another aspect of the invention, the resource may be a remote database of destinations to which to travel. Thus, identifying a topological criteria may include determining a current location and searching the database. The search may include selecting those destinations satisfying a first proximity criteria to identify candidate destinations. The proximity criteria may include line-of-sight (i.e., great circle distance) between points such as the current location and the location of the destination. An alternative criterion considers proximity to a proposed itinerary and/or planned route of travel. Still another alternative considers proximity of resources to each other so as to minimize travel distance and/or time if several destinations are to be visited. The current location is compared to a location of the candidate destination using second proximity criteria and the candidate destinations are displayed together with associated results of the comparison. Current location may be determined by various means including using an earth orbiting based GPS.

According to another aspect of the invention, a method of identifying resources includes accessing a remote server from a client and transmitting a displayable form to the client. Location information is encoded with a request for identification of a class of resources, all of which is transmitted to the remote server. A database search is performed to identify resources contained within the class, e.g., user facilities such as restaurants and hotels, and network facilities such as gateways, databases, mirror sites, etc. The search also attempts to satisfy proximity criteria based on the location information to identify a list of resources for transmission to the client. Results are displayed so as to indicate a degree to which search criteria are satisfied. Thus, resources may be listed in order of distance, travel time, proximity to route of travel, etc. This listing may also take into consideration a confidence level of the search results to prefer resources most closely satisfying search criteria. Thus, an indication may be provided to emphasize nearby resources having a high probability of satisfying search criteria (e.g., those resulting in a good match of search terms) over more distant resources having a low confidence level.

Weighting of location and class search results may further take into consideration proximity of resources to each other so that an accumulated confidence level is computed, reflecting an enhanced likelihood that at least one of several relatively nearby resources will be able to satisfy a user's requirements with one trip or detour.

According to a feature of the invention, location information is encoded using a CGI to transmit the location information from the client to the server. The method may further include a step of calculating a position of the client using, for example, GPS or address information supplied by the client. The method may further store information in the database in connection with each of the resources in a form such that the resources are accessible based on the class and the proximity criteria. Accordingly, the database may support multidimensional searches for both location of a resource and some other criteria, such as service provided, etc.

According to another aspect of the invention, an information server includes a database of resources searchable by both (i) location criteria and (ii) a category of resource criteria. A communications interface provides connectivity to a data network (e.g., LAN, WAN, Internet, etc.) A computer, processor, or other control element or logic is configured. (e.g., programmed) to receive an inquiry from a client on the data network. The inquiry may be, for example, a request to locate a nearby facility, access to a software download database, etc. The control logic responds to the request by transmitting a form to the client, the form including a request for a location of the client and a category of resources requested by the client. The location request may be explicit, requiring, for example, manual entry of an address, or may initiate processing to automatically provide address information, either directly or indirectly. The category may be in the form of a class of resource to be found (e.g., specifying products or services offered for sale) or be some other search mechanism, such as one or more key words. Once client location and category are supplied, resources within the category of resources requested by the client and located nearest the client are identified.

According to a feature of the invention, location information about the client is supplied in a format including one of (i) a street address, (ii) a postal zipcode, (iii) city and state information, (iv) latitude and longitude values, (v) an area code in accordance with the North American Numbering Plan (NANP), and (vi) Telephone Number Area Code and Prefix (NPA-NXX).

According to another aspect of the invention, a mobile navigation assistant includes positioning logic providing a current position of the assistant. A wireless communications system is connected to a remote database of facilities. An input device receives a search criteria, an indication of facilities satisfying the search criteria being identified and displayed together with positional information relative to said current position. The mobile navigation assistant may also include GPS access providing the positional logic, or a database of map information, where the display provides a graphic representation of the facilities and the current position. The user can input a category of the facilities, may access a database through the Internet, and may have the display provided on a heads-up display presentation. The display may indicate best choices by icon type, size, color, brightness, etc., so that facilities best satisfying search criteria and closest to a specified location are emphasized over others. System inputs may come from manually activated switch mounted on a vehicular steering wheel or a speech recognition system.

According to another aspect of the invention, a vehicular navigation system includes a graphical display mounted in a motorized vehicle. A location system responds to data provided by a constellation of earth orbiting satellites (e.g. GPS) to provide a current position of the vehicle. A wireless communications system provides data communications with resources connected to the Internet. An input device is configured to receive a manual selection input from a user. A map database, including information about routes, is graphically displayed to provide a moving map of the routes relative to a current position together with an indication of information from the Internet. Internet information may include distances to resources from the current location. The input device may include a graphic input device for selecting a facility identified by the graphical display with the wireless communications system configured to retrieve information about the selected facility from the Internet.

Another feature of the invention provides for supplemental and manual access to the Internet using a combination of GPS derived positional and time data, manually provided data using touch panel, keyboard, speech recognition, and other forms of operator initiated input. The system also accepts, incorporates and uses vehicle sensor derived information such as speed and direction, inside/outside temperature, vehicle system status and alerts, airbag deployment, cellular telephone derived information, etc. The system may further track sites already visited or otherwise eliminated from consideration to update the display of resources and, if desired, initiate a new search.

According to another feature of the invention, GPS and Internet data is combined and processed together with information available from, and used to supplement other systems. For example, the system may automatically dial telephone numbers to make reservations or appointments or integrate with an automatic toll collection system to speed travel along toll roads and through toll plazas.

The present invention is directed to a system and method which displays location dependent information through the steps of determining its current location, accessing an electronic database, selecting potential destinations from the electronic database, comparing the current location to the potential destinations, generating comparison criteria for comparing the potential destinations and displaying the potential destinations and the comparison data to the user. The current location can be determined through the use of a global positioning system, user input, a selection from a defined list or a street address. The electronic information accessed can be the Internet or a similar facility or information source. The selection of potential destinations is based on the user's input and potential destinations can be categorized by comparisons performed between alternative potential destinations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
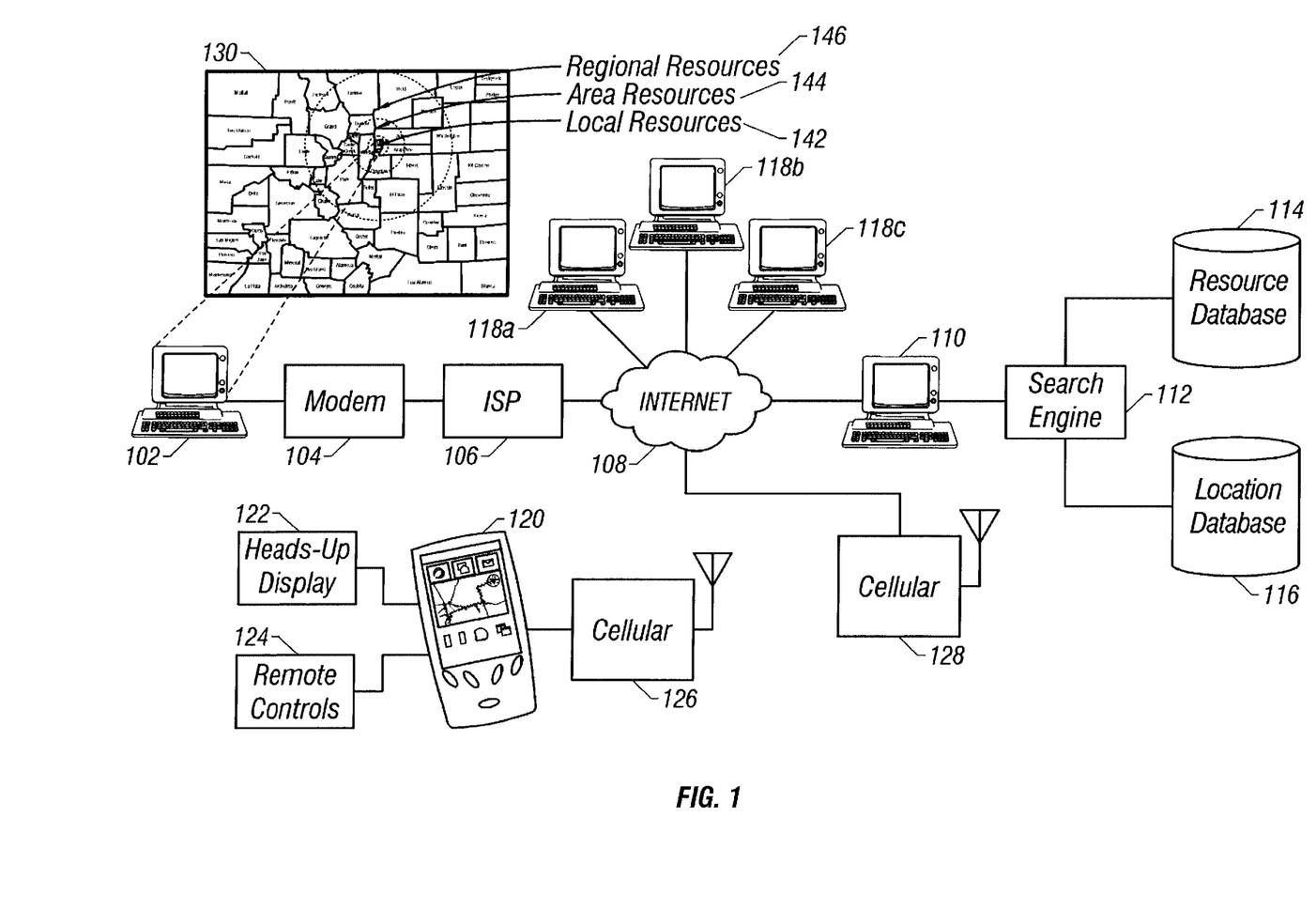
FIG. 1 is a diagram of a data retrieval system according to the invention.

FIG. 1 is a diagram of a data retrieval system according to the invention. A client terminal 102 is connected to a modem 104 to access an Internet service provider (ISP) 106 providing access to Internet 108. Client terminal 102 includes appropriate browser software and supporting operating system, utilities and plug-ins for accessing the World Wide Web (WWW) resources on Internet 108 and is compatible with common gateway interface (CGI) protocols and standards for responding to information requests made by a remote server such as server 110. Server 110 is likewise interfaced to Internet 108 and includes a search engine capability 112 for accessing and searching resource and location databases 114 and 116. Also connected to Internet 108 are servers 118A–18C providing other services and databases and/or representing websites associated with a resource having an Internet presence on the web e.g., web pages established or maintained by retail establishments.

Personal digital assistance (PDA) 120 provides a mobile capability for accessing Internet 108 via mobile cellular system 126 and cellular base station network 128, the latter connecting to Internet 108 via, for example, an appropriate router (not shown). PDA 120 may be incorporated into or mounted in a vehicle in which case, a display may be generated using heads-up display unit 122 to project a virtual image onto an appropriate glass near the windshield of the vehicle. Heads-up display unit 122 allows the vehicle operator to view information including a moving map display without looking away from the road. Remote controls 124 provide data and control inputs to PDA 120. These remote controls may include, for example, steering wheel mounted switches, a voice response unit, eye-movement detector, and other forms of transducers, preferably usable with only minimal diversion of the attention of the vehicle operator and distraction away from driving related tasks.

For purposes of the following example, client terminal 102 may be assumed to be located in a particular geographic location, e.g. Denver, Colo. as depicted on map 130. In this example, a user of client terminal 102 may use the system according to the invention to identify resources within the general vicinity of the user's location. Thus, resources in the immediate facility of the user may be defined by some criteria, such as a relatively small circular region centered on the user's location, e.g., local resources 142. Further criteria may be established to expand the area of interest to define expanding criteria for identification of appropriate resources including, for example, area resources 144 and regional resources 146 defined by circles of increasing radii. While location criteria according to the present example are illustrated in relation to the users location, the invention is equally applicable to other geographic criteria, including, for example, resources proximate to a destination location or along a route of travel. Further, as will be emphasized below, the invention is further applicable to non-geographic, topological constraints including, for example, communication network resources.

Referring to FIG. 1, operationally, a user at client terminal 102 initiates a search for a particular resource by inputting the appropriate URL (uniform resource location) corresponding to a webpage supported by server 110. In response, server 110 transmits an appropriate HTML page to client terminal 102, preferably as a displayable form requesting that the user provide location information together with an indication of a class of resources desired. The location information may be provided in the form of a street address, zipcode, zip+4, local area code (NPA), local telephone exchange (NXX), ordered pair of latitude and longitude values, etc. The class of resource may include those typically used, for example, by yellow page directories (e.g., products and/or services such as automotive repair and service facilities, locksmiths, etc.), a categorization specific to the operator of the server (e.g., sales, service and training centers for a particular vendor or product) or other forms of search criteria (e.g. search terms, key words, boolean logic expressions, etc.) Server 110 receives the appropriate location information together with any location based criteria specified by the user (e.g. requirement that resources be identified within 10 miles of the users location), together with the class of resource information as previously described. Server 110, using search engine 112, accesses local database 116 as necessary to convert the location information into a useful form. For example, if the location is specified as a street address, location database 116 may be used to convert that location format into an ordered pair of latitude and longitude values. Likewise, location database 116 may be used to translate other forms of addresses including the zip+4 into appropriate latitude, longitude coordinates. Once translated, the latitude, longitude pair may be used to define entries into resource database 114 meeting proximity requirements set by the user or used by default. Search engine 112 further uses the class of resource information to identify and retrieve the identity and location of qualifying resources listed in the resource database.

Resource database 114 may be populated and updated on a non-realtime basis by search engine 112 using, for example, a web crawler to search for resources accessible by Internet 108 for listing in resource database 114. Alternatively, search engine 112 may search Internet 108 in realtime in response to a user inquiry to identify Internet resources satisfying both location and class of resource criteria.

PDA 120 operates in a similar fashion to that of client terminal 102. However, since PDA 120 is assumed to be mobile, positional information may be supplied automatically using, for example, a global positioning system (GPS not shown). In this case, the resources identified by server 110 may be graphically displayed in a moving map type format on PDA 120 or an associated heads up display 122.

Figure 2:
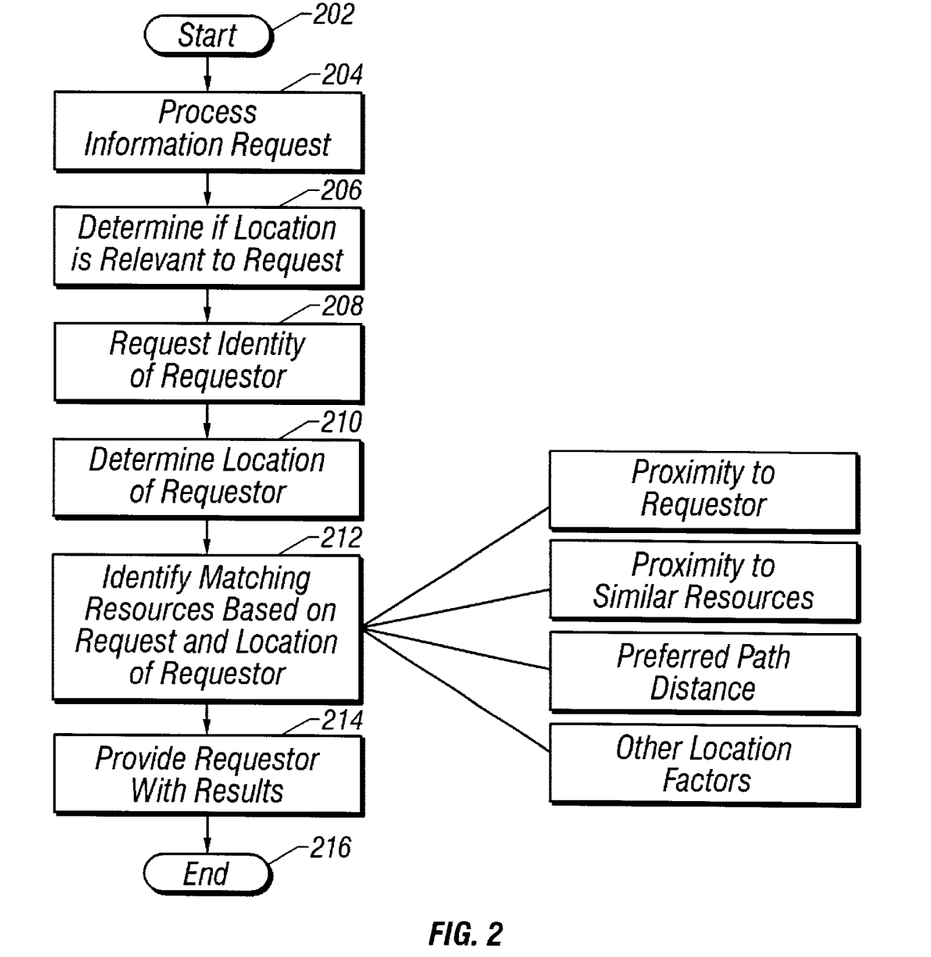
FIG. 2 is a flow diagram of a method of accessing and retrieving location relevant information.

FIG. 2 is a logic flow diagram of a method according to the invention for providing topologically relevant information in connection with an information request. Processing starts at 202 and, at step 204 an information request is processed. At step 206, a determination is made if the location is relevant to a request. That is, if the request is seeking information in which location criteria may be used to refine the search or is otherwise particularly relevant to processing of the search request. For example, general information requests about such things as warrantees supplied by a manufacturer may not be amenable to refinement according to location criteria, while requests for the location of service or sales centers should be searched to identify those within some geographic constraint. If identification of matching resources would be helped by identification of the location of the requestor, then this information is solicited at step 208 where the identity of the requestor is provided. This identity information may be any form of identity that could be attached to or associated with a particular location including, for example, an address which could then be translated to an appropriate location at step 210. The significance of step 208 is additionally apparent in connection with other encoding of the identity of a requestor that may be less directly associated with the location, for example, wherein a customer name is associated with their address in a corporate database or the identity of a node on a network can be translated into a location of that node within the topologically of the network.

At step 212 resources satisfying the request and location criteria of the requestor are identified. Such location criteria may be include proximity of the resource to the requester, proximity of similar resources (i.e., concentration of matching resources within a given region) such that the average distance to any one of the resources is a factor, path distance to a resource, and other factors. Results of the search are provided to the requestor at step 214. As previously mentioned, the results may be provided in a number of formats including as a textual list, graphics display or moving map display. The results may also include an indication of distances to resources and confidence of match using appropriate icons, colors, highlighting, arrangement, placement, or other indicia of resource ranking.

Figure 3:
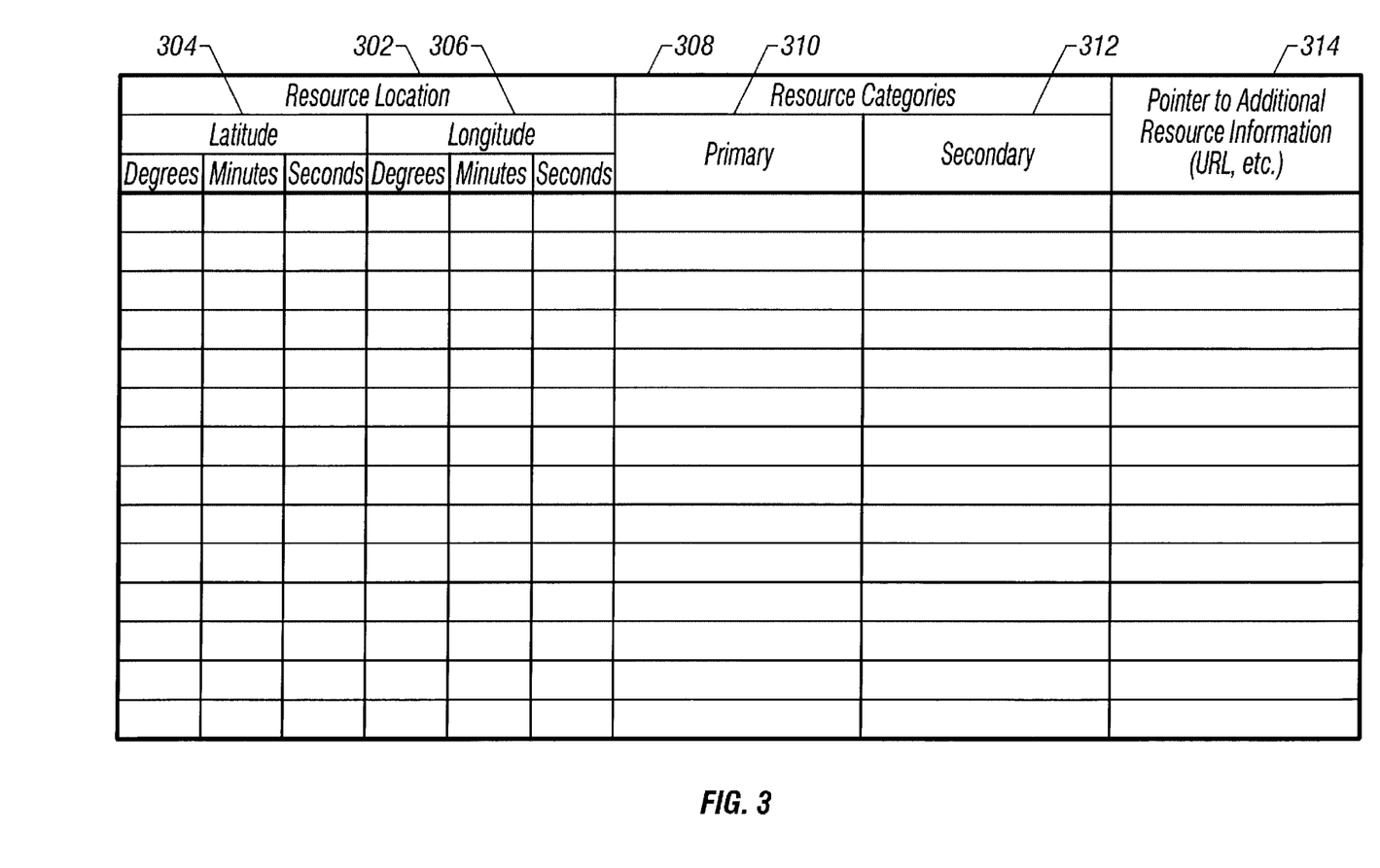
FIG. 3 is a diagram of a database data structure in the form of a flat file including resource location information.

Referring to FIG. 3, a file architecture of an appropriate database structure corresponding to resource database 114 (FIG. 1) is depicted. The structure shown is a flat file including entries for resource location 302, the location including latitude and longitude entries 304 and 306. Resource categories 308 may indicate both primary 310 and secondary 312 classification of a resource according to a predetermined classification scheme such as commonly used for a yellow page type listing. Each entry further includes a point or two of additional resource information 314 which may include a web URL address or other links to information.

Figure 4:
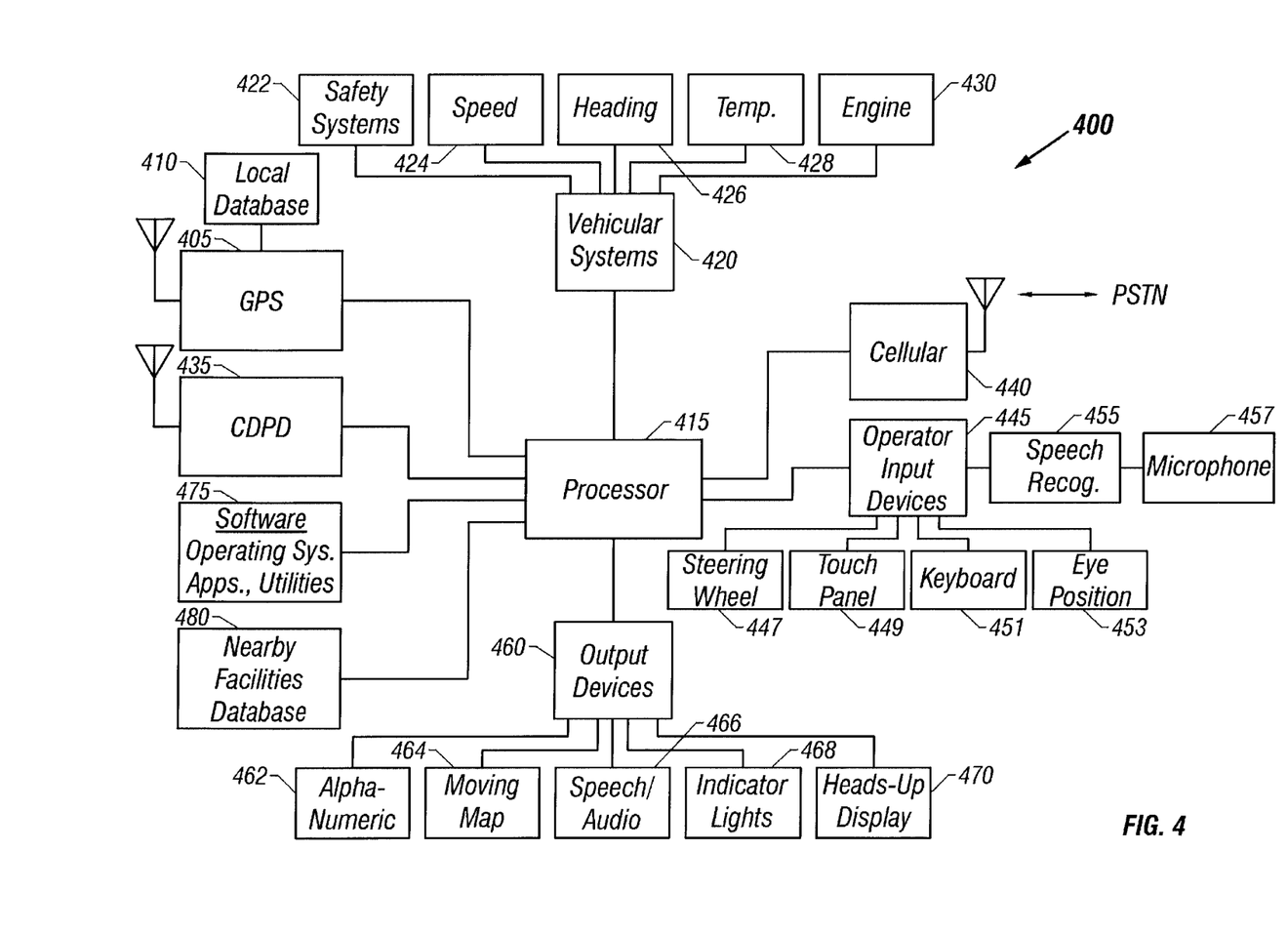
FIG. 4 is a block diagram of a mobile data retrieval system according to the invention.

FIG. 4 is a block diagram of a system 400 which implements the present invention. A GPS receiver 405 in conjunction with a local database 410, may be used by processor 415 to determine a current position of the system. Alternately, if a starting position is known, the vehicular systems 420, with various inputs, for instance safety systems 422, speedometer 424, heading indicator 426, temperature 428 and the engine 430, can be used to determine the current location or to support the calculation of specific arrival times. Inputs from status engine 430 may automatically prompt a display of service station locations, local AAA offices and associated phone numbers using the system. A connection can be maintained with the Internet via CDPD link 435 or through the public switched telephone network (PSTN) via cellular service 440.

Operator input device 445 can, for instance, consist of one or more switches mounted in or to steering wheel device 447, touch panels 449, keyboard 451, eye position detection 453, or speech recognition software 455 and a microphone 457. Operator output device 460 can include alpha-numeric displays 462, moving map display 464, speech and audio devices 466, indicators 468 and heads-up displays 470. Moving map display 464 may be an LCD, CRT or electroluminscent display mounted in the vehicle dashboard. The heads-up display 470 may be used in combination with the eye position detector to highlight alternate operator selections with buttons available on the steering wheel for selection identification. Speech recognition capabilities may be used to request and select resources and provide other information to the system based on recognition of an individual's voice and specific input commands. Processor 415 also requires operational software 475. Local storage of search results is provided by nearby facilities database 480.

Figure 5:
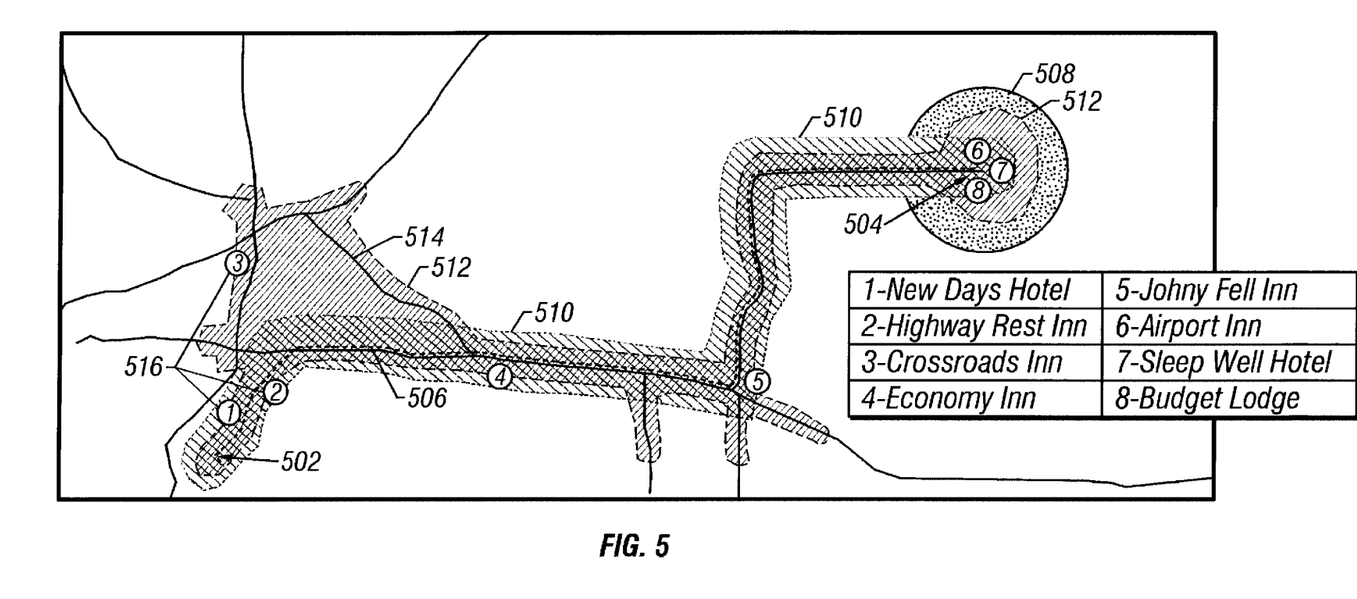
FIG. 5 is a map depicting an example of a route between departure and destination points the Denver, Colo. vicinity.

FIG. 5 depicts a road map display on which is superimposed a planned route 506 from starting point 502 to destination 504. The map further illustrates geometries that may be used as a basis to establish proximity criteria used to search for resources. For example, in response to a user requesting resources within a specified distance of destination 504, a circular area 508 defining the acceptable region may be used to identify suitable resources. In this case, for example, resources 6, 7 and 8 corresponding to the identified hotel facilities are depicted falling within the search region. Another search includes defining a region 510 to identify resources within a predetermined mileage criteria from the route of travel 506. In this case, resources 1, 2, 4 and 5 are identified in addition to the previously identified accommodations 6, 7, and 8. Another location criteria includes time to travel, in which case more distant resources may be identified where those resources are easily accessible, e.g., the time to travel to those resources are within the stated criteria. In the example of FIG. 5, location 3 is calculated to be within a reasonable driving time criteria of the planned route and is included within driving time based criteria area 512.

Figure 6:
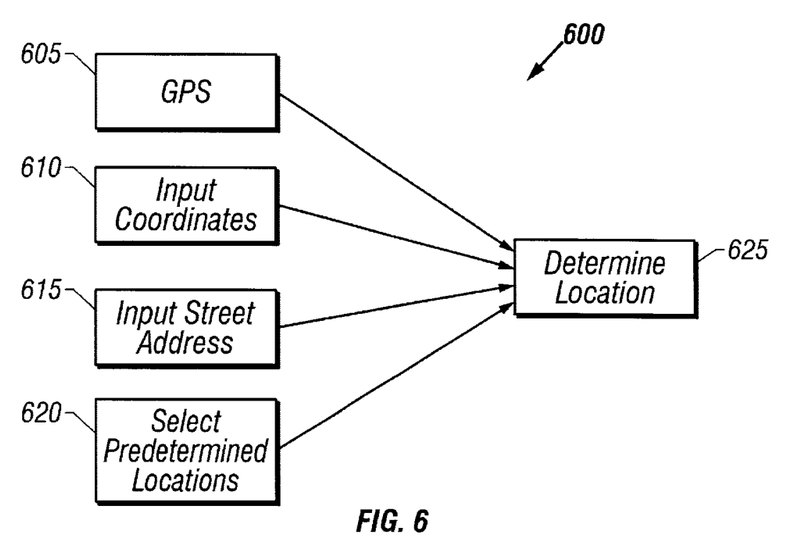
FIG. 6 is a flow diagram of the determination of the current location.

Flow diagram 600 of FIG. 6 shows several methods of determining a current position. Block 605 uses a current GPS reading to determine present location. Alternatively, Block 610 allows a user to input their geographic coordinates. The coordinates can be inputted using latitude and longitude or similar Cartesian coordinates. Alternatively, Block 615 allows the user to input the current street address including city and state. If a street address is entered by a user, the street address will be converted by the system to geographic coordinates. This conversion can be performed via access to database 116 (FIG. 1) or by calculations well known in the art. Current position may also be derived from vehicular system derived data (e.g., speed and compass direction) used to update a prior position calculation and provide a new estimated current position. This position may be refined by the user by providing additional manual input based on system prompted requests. For example, the system may request the user to select from among road mileage indicators, exit numbers, or other location indicia pertinent to the predicted current position.

At Block 620 numerous predetermined locations closest to their current location are displayed for the user to select. These predetermined locations are paired to geographic coordinates within the database. Current position can also be determined using a predetermined location as a starting point and using vehicular system derived data to update the position. In each case, the appropriate values are used at Block 625 to determine current location. Ultimately the user's geographic coordinates are determined in Block 125.

Figure 7:
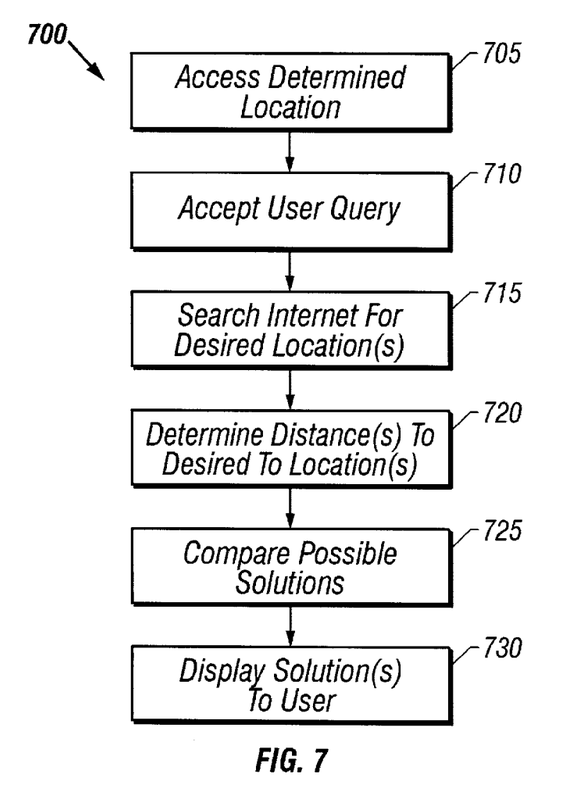
FIG. 7 is a flow diagram of the identification of locations matching the user's inquiry.

Flow diagram 700 of FIG. 7 depicts processing associated with the location determined in Step 625 of FIG. 6. In Step 705, the system accesses the stored location of the data. At Step 710, the user has submitted a question or request for information from the system. This question or request for information can pertain to the location of a specific establishment or to a type of establishment e.g., rest stop, restaurant, service station, historic site, etc. At Step 715, the system searches the Internet for locations which match the user's inquiry at Step 710 or for solutions to the user's questions. At Step 720, using the location determined at Step 625 of FIG. 6, the system determines the distance from the current location to the selected location. If more than one location was identified at Step 715, then the system determines the distances to each of the selected locations. At Step 725, the possible solutions are compared and displayed to the user at Step 730.

For example, suppose a user is scheduled to depart city A on the last flight of the day. If the flight is canceled, the user knows his current location and desires to find a hotel room close to that current location. If the user has access to a GPS, their location can be determined at Step 625 (FIG. 6) through the GPS input of Block 605. Alternatively, the user can input their street address or the airport name, if the airport is one of the predetermined locations contained in the database. Each of these methods allows the system to determine its current location. Referring now to FIG. 7, once the system has determined its current location, the user can request a list of hotels within a selected area, such as a one mile range of the current location or of the airport. This inquiry occurs at Step 710. At Step 715, a search is performed on the Internet for all of the hotels located near airport A. At Step 720, the distances from the current location identified in Step 625 of FIG. 6 to each of the hotels (identified at Step 715 of FIG. 7) are calculated. At Step 725 each of these distances would be compared to the one mile criteria requested by the user in Step 710 of FIG. 7. Finally, in Step 730, a list of hotels within the one mile range, the user's criteria, would be displayed to the user. One skilled in the art would also understand that as the location of the portable device changed, the solution to a similar inquiry by the user would also change.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for identifying resources, said method comprising:
   identifying a class of information to be retrieved;
   identifying a topological criteria, said topological criteria comprising a data path topology between a location and at least one resource of a data network;
   identifying a resource of said data network that satisfies said topological criteria;
   searching said resource for said class of information.

2. The method of claim 1 wherein said location comprises a location of a requestor; and
   wherein said data path topology comprises closest resource on said data network to said location.

3. The method of claim 1 wherein said location comprises a location of a requestor; and
   wherein said data path topology comprises least amount of network traversal between said location and a resource of said data network.

4. The method of claim 1 wherein said class of information is identifiable by a key;
   wherein said method further comprises transmitting said key and said topological criteria to a remote server; and
   wherein said remote server performs said identifying of said resource satisfying said topological criteria.

5. The method of claim 1 wherein said method further comprises identifying another topological criteria; and wherein said searching comprises searching said resource for said class of information also satisfying said another topological criteria.

6. The method of claim 5 wherein said class of information is identifiable by a key, and said method further comprises:

transmitting said key and said another topological criteria to a remote server; and returning a result of said searching step to a requestor.

7. The method of claim 6 wherein said method further comprises establishing communications with said resource; and returning target data associated with respective physical facilities in response to said key and said another topological criteria.

8. The method of claim 7 wherein said physical facilities are identified by respective street addresses.

9. The method of claim 5 further comprising communicating location information to a remote server using a common gateway interface (CGI).

10. The method of claim 9 further comprising transmitting to a client a list of facilities having said class of information and satisfying said another topological criteria.

11. The method of claim 5 wherein said resource comprises a remote database of destinations;

said step of identifying another topological criteria comprises a step of determining a current location of a requestor; and said step of searching said resource comprises selecting ones of said destinations satisfying a first proximity criteria to identify candidate ones of said destinations;

comparing said current location of said requestor to at least one location of said candidate destinations using second proximity criteria; and displaying said candidate destinations together with associated results of said comparing step.

12. The method of claim 11 wherein said step of determining said current location comprises computing a present position using a global positioning system (GPS).

13. The method of claim 1 wherein said step of identifying said topological criteria comprises computing said location using a global positioning system (GPS).

14. The method of claim 1 wherein said step of identifying said topological criteria comprises computing said location using vehicle sensor derived information.

15. The method of claim 1 wherein said data network comprises the Internet.

16. A method of identifying resources, the method comprising identifying a topological criteria, said topological criteria comprising a data path topology between a location and at least one remote server of a data network;

identifying a remote server of said data network that satisfies said topological criteria;

accessing said remote server from a client;

transmitting a displayable form to said client;

encoding location information;

transmitting a request for identification of a class of resources together with said location information to said remote server;

searching a database for resources (i) contained within said class and (ii) satisfying proximity criteria based on said location information to identify a list of resources; and transmitting said list of resources to said client.

17. The method of claim 16 wherein said step of encoding comprises a step of:

using a common gateway interface (CGI).

18. The method of claim 16 further comprising calculating a position of said client.

19. The method of claim 18 wherein said location comprises said position of said client.

20. The method of claim 16 further comprising storing information in said database in connection with each of said resources in a form such that said resources are accessible based on said class and said proximity criteria.

21. The method of claim 16 wherein said location information is in a format including one of: a street, address, a postal zipcode, city and state information, latitude and longitude values, an area code in accordance with the North American Numbering Plan (NANP), and Telephone Number Area Code and Prefix (NPA-NXX).

22. A mobile navigation assistant comprising:

positioning logic providing a current position of the assistant;

a wireless communications system connected to a data network;

resource identification logic for identifying a remote database of facilities of said data network, said remote database satisfying a topological criteria, said topological criteria comprising a data path topology between a location and at least one resource of said data network;

an input device for receiving a search criteria; and a display providing an indication of ones of said facilities satisfying said search criteria together with positional information relative to said current position.

23. The apparatus of claim 22 wherein said positioning logic comprises a global positioning system (GPS); and wherein said apparatus further comprises a database of map information, said display providing a graphic representation of said ones of said facilities based on said map information and said current position.

24. The apparatus of claim 22, wherein:

the search criteria comprises a category of said facilities;

said display comprises a virtual image projection providing a heads-up display presentation;

said input device comprises a manually activated switch mounted on a vehicular steering wheel; and said input device comprises a speech recognition system.

* * * * *